(12) United States Patent
Easton et al.

(10) Patent No.: US 8,598,502 B2
(45) Date of Patent: Dec. 3, 2013

(54) MOTIONLESS FOCUS EVALUATION TEST STATION FOR ELECTRO-OPTIC (EO) SENSORS

(75) Inventors: Michael P. Easton, Tucson, AZ (US); Casey T. Streuber, Tucson, AZ (US); Page Elizabeth King, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 289 days.

(21) Appl. No.: 13/073,661

(22) Filed: Mar. 28, 2011

(65) Prior Publication Data

US 2012/0249803 A1 Oct. 4, 2012

(51) Int. Cl.
*G02B 7/04* (2006.01)
*G02B 26/02* (2006.01)

(52) U.S. Cl.
USPC .......................................... 250/201.2; 359/236

(58) Field of Classification Search
USPC .......... 250/201.1, 201.2, 201.3, 201.4, 201.7, 250/201.8, 204, 559.3, 559.38, 559.39; 359/29, 225, 226, 232, 233, 235, 236
See application file for complete search history.

(56) References Cited

U.S. PATENT DOCUMENTS

| 3,899,921 A | * | 8/1975 | Hockley | 73/579 |
| 5,208,451 A | * | 5/1993 | Deck | 250/201.3 |

* cited by examiner

*Primary Examiner* — Kevin Pyo
*Assistant Examiner* — Don Williams
(74) *Attorney, Agent, or Firm* — Eric A. Gifford (57) ABSTRACT

A motionless focus evaluation test station is provided for measuring detector position error of EO sensors that do not possess dynamic focus capability. A positionally-fixed source emits EM radiation that diverges along an optical axis of the test station. Collimating optics collimate the EM radiation and direct it along the optical axis to the EO sensor. A positionally-fixed target is placed in the path of the diverging EM radiation nominally at the focal plane of the collimating optics. The target comprises a limiting aperture that exhibits an induced shift in optical focus at different positions along the aperture such that different positions on the target are imaged to different focal planes at the detector. The detector captures an image of the target that is blurred to either side of the spatial position that is optically conjugate to the actual detector position. A processor processes the image to measure the blur as function of spatial position to measure the actual detector position and output detector position error from a desired detector position.

17 Claims, 13 Drawing Sheets

MOTIONLESS FOCUS EVALUATION TEST STATION FOR ELECTRO-OPTIC (EO) SENSORS

BACKGROUND OF THE INVENTION

1. Field of the Invention

This invention relates to focus evaluation test stations for characterizing position error in an EO sensor that does not possess dynamic focusing capability, and more particularly to a motionless test station that does not translate the source and target to vary the apparent axial EO Sensor image position.

2. Description of the Related Art

A particular class of Electro-Optical (EO) sensors comprises an optical assembly that focuses collimated electromagnetic (EM) radiation onto a detector. The detector is nominally positioned at a known desired position. Typically, the detector is positioned at the focal plane of the optical assembly for optimum focus if the system is set for infinity focus. However, it may be desirable to position the detector elsewhere. This class of EO sensor has no dynamic focusing capability to adjust the position of the detector. The detector is responsive to wavelengths of EM radiation that lie in a range between 0.2 to 30 microns. A detector may, for example, cover visible 0.4-0.7 um, NIR 0.7-1.1 um, SWIR 1.1-2.5 um, MWIR 3-5 um or LWIR 8-14 um.

During assembly of the EO sensor, the detector is placed at a known desired position relative to the optical assembly (e.g. the back focal plane of the optical assembly) within the mechanical tolerance of the assembly process. This tolerance measured as $\Delta d$ between the desired detector position $d_{desired}$ and the actual detector position $d_{actual}$ may be unacceptably large in terms of optical aberrations. In general, an EO sensor may be considered to be "imaging well" if the root-mean-square (RMS) error of the aberrations is less than or equal to ¼ wave. While not a strict metric, this rule of thumb insures that the point spread function retains its general shape. For military and high-end commercial EO sensors, it is important that the sensor is "imaging well" over a variety of temperature and vibration environments. Consequently, the EO sensor is tested to determine detector position error; the distance of actual detector position from the desired detector position. If the detector position error is not within the specific optical tolerance, the position of the detector may be changed by, for example, inserting mechanical "shims" into the assembly.

Figure 1:
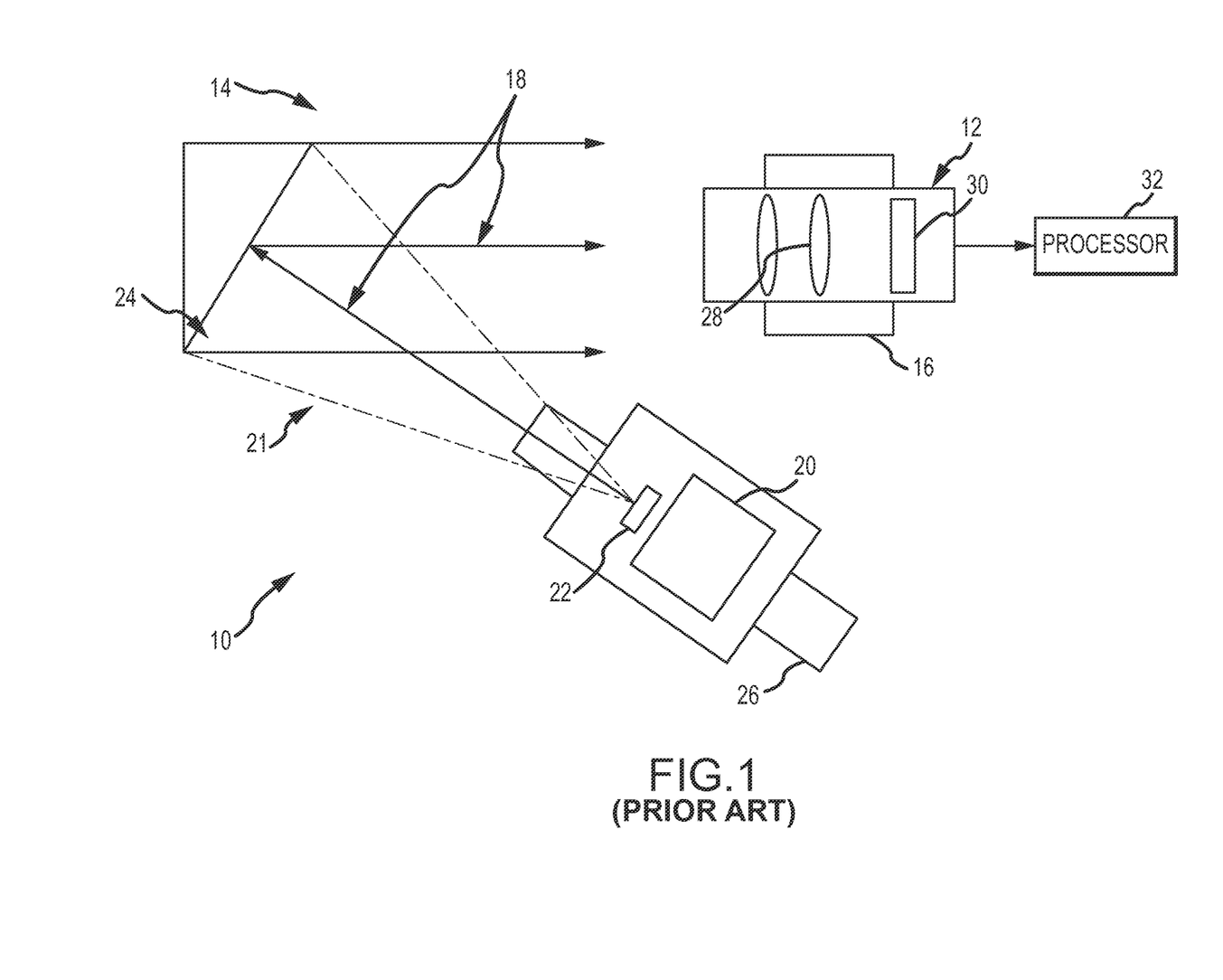
FIG. 1, as described above, is a known focus evaluation test station for EO sensors that do not possess a dynamic focusing capability.
Figure 2:
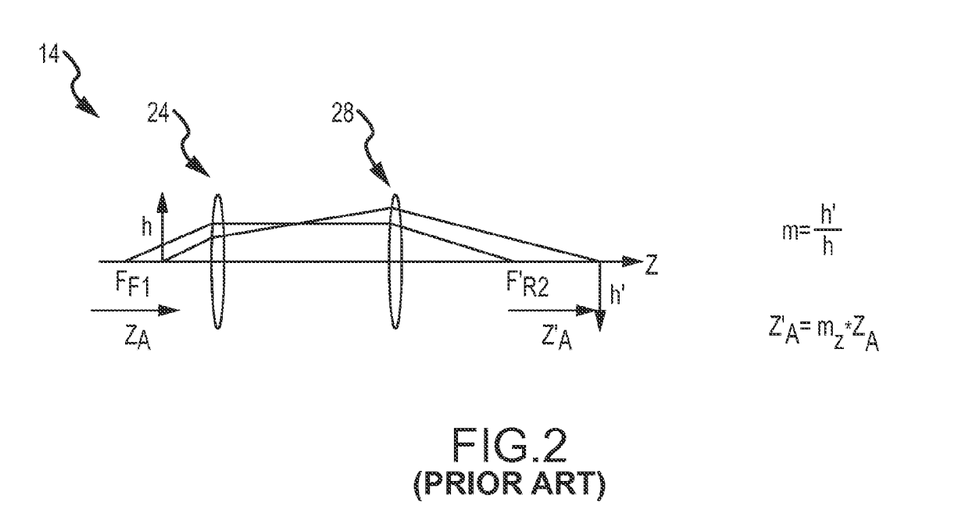
FIG. 2, as described above, is a diagram of the afocal optical system formed by the EO sensor and collimating optics of the test station.

A focus evaluation test station 10 for measuring the detector position error $\Delta d$ of an EO sensor 12 and an afocal optical system 14 formed by the test station and EO sensor are shown in FIGS. 1 and 2. The point spread function (PSF) describes the response of the imaging system to a point target. The degree of broadening (blurring) of the PSF is a measure of the quality of the imaging system. Other factors being equal, the blurring of the PSF will be minimum when the detector is positioned at the desired position.

Test station 10 comprises a fixture 16 for mounting the EO sensor 12 so that its optical axis is coincident with an optical axis 18 of the test station. A source 20 emits diverging EM radiation 21 along the optical axis 18. A target h 22 such as a single slit is positioned orthogonal to optical axis 18 at the front focal plane $F_{F1}$ of collimating optics 24. Source 20 and target 22 are mounted on a linear translation stage 26 that moves parallel to optical axis 18 to move the position of target 22 by a distance $Z_A$ about its nominal position at the front focal plane $F_{F1}$. Each position on target 22 is focused at the same image plane a distance $Z'_A$ from the rear focal plane $F'_{R2}$ of the EO sensor's optical assembly 28 where the detector 30 is nominally positioned. The transverse magnification m (x-y plane orthogonal to optical axis 18) is defined by the ratio of the EO sensor back focal length and the collimating optics front focal length. The longitudinal magnification $m_z$ (along the optical axis 18) is defined as the square of the transverse magnification. The target h is magnified to a conjugate target h'=m*h and $Z'_A = m_z * Z_A = m^2 * Z_A$. A processor 32 receives images captured by detector 30 and processes them to determine the detector position error.

Figure 3:
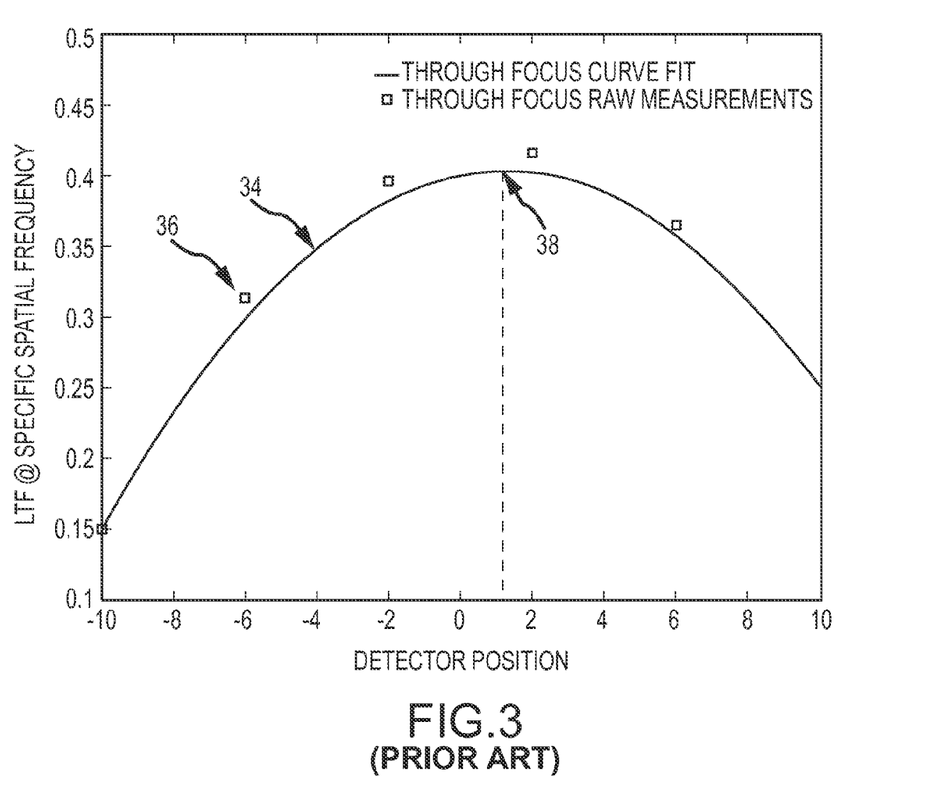
FIG. 3, as described above, is a through focus curve generated by the test station for an EO sensor.

To test EO sensor 12 and measure its detector position error, linear translation stage 26 moves target h 22 to a known position $Z_A$. Detector 30 captures an image of target h 22. Processor 32 computes, for example, a 2-d FFT of the image (or impulse response convolution). The processor samples the 2-D FFT orthogonally to the orientation of the slit to produce a Line Transfer Function (LTF). The LTF may be integrated over all spatial frequencies or sampled at a predetermined spatial frequency to produce a value that is recorded along with stage position $Z_A$. Using the equations above for longitudinal magnification, the processor maps the stage position $Z_A$ to the image plane position $Z'_A$. This process is repeated for multiple stage positions. The processor fits a through focus curve 34 to the raw measurements 36 of paired LTF values/image plane positions as shown in FIG. 3. Through focus curve 34 is typically fit with a quadratic or fourth order polynomial curve with the peak 38 denoting the detector plane position $Z'_A$. In some cases, the through focus curve covers large amounts of defocus and is more accurately fit with a Gaussian functional form. In either case, the peak 38 corresponds to the value of $Z'_A$ for the actual position of the detector. The difference between the computed $Z'_A$ and the desired $Z'_A$ (usually at or near the rear focal plane of the EO Sensor 12, if the system is set for infinity focus) is the detector position $\Delta d$. This difference is equivalent to the shift of the peak from the desired detector position.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a motionless focus evaluation test station for measuring detector position error of an electro-optical (EO) sensor. The EO sensor comprises an optical assembly that focuses collimated electromagnetic (EM) radiation onto a detector nominally positioned at a known desired position (e.g. the back focal plane of the optical assembly). The EO sensor has no dynamic focusing capability to adjust the position of the detector.

In an embodiment, the motionless focus evaluation test station comprises collimating optics, which together with the EO sensor form an afocal optical system. A positionally-fixed EM source emits diverging EM radiation having wavelengths that lie in a range of 0.2 to 30 microns along the optical axis of the test station. A positionally-fixed target is placed in the path of the diverging EM radiation with a known position on the target (typically target center) at the focal plane of the collimating optics. The target comprises a limiting aperture that exhibits an induced shift in optical focus at different positions along the aperture such that different positions on the target are focused at different image planes. The target may be physically or optically canted to provide the induced shift in optical focus. A physically canted target is positioned at a non-perpendicular angle to the optical axis. An optically canted target is mounted on an optical material with refractive index greater than air having non-parallel opposing surfaces to provide the induced shift in optical focus. The target (and optical material) may be rotated to a non-perpendicular angle around the optical axis to allow for sub-pixel sampling of the effective point spread function (PSF). Since the detector is fixed in a single transverse plane to the optical axis, the detector captures an image in which the effective PSF is broadened (blurred) for positions on the target that are optically conjugate to either side of the actual detector position. A processor processes the image to measure the blur as a function of spatial position and thereby determine the actual position for the detector. The processor may, for example, compute the attenuation of spatial frequencies or blur as a function of spatial position in the image to generate a "through focus curve" or iteratively simulate the test station and EO sensor response to fit a simulated image to the detected image. Knowing the actual and desired positions of the detector, the processor calculates the detector position error.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a motionless focus evaluation test station for measuring detector position error of an EO sensor that does not possess a dynamic focusing capability. Advantages of the motionless test station may include a smaller foot print and lower system cost by eliminating the linear translation stage, higher throughput and higher fidelity of detector position error measurement.

Figure 4:
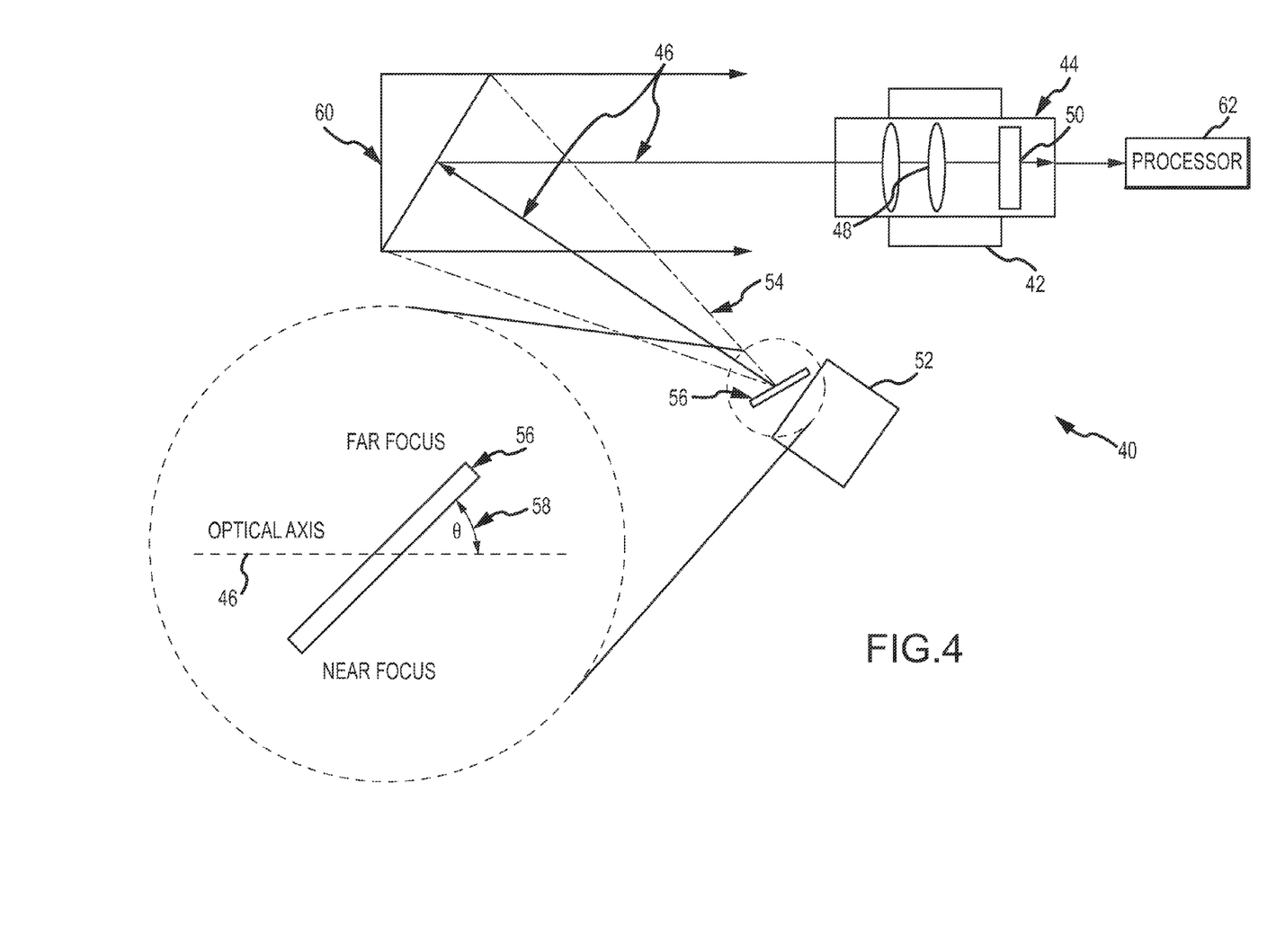
FIG. 4 is an embodiment of a motionless focus evaluation test station in accordance with the present invention for EO sensors that do not possess a dynamic focusing capability.

In an embodiment shown in FIG. 4, a motionless focus evaluation test station 40 comprises a fixture 42 for mounting an EO sensor 44 so that its optical axis is coincident with the test station's optical axis 46. EO sensor 44 comprises an optical assembly 48 that focuses collimated EM radiation onto a detector 50 nominally positioned at a desired detector position ($d_{desired}$) such as the back focal plane of the optical assembly.

A positionally-fixed source 52 emits EM radiation 54 that diverges along optical axis 46. A positionally-fixed target 56 is canted at a non-perpendicular angle $\Theta$58 to optical axis 46. Target 56 comprises a limiting aperture that when physically canted exhibits an induced shift in optical focus at different positions along the aperture such that different positions on the target are imaged to different planes along the optical axis. The target may be rotated to a non-perpendicular angle $\Phi$ around the optical axis to allow for sub-pixel sampling of the effective point spread function (PSF). Target 56 is positioned so that a known position on the target, typically target center, is at the front focal plane of collimating optics 60. The calibration of target position may be performed by using a known infinity focused telescope in place of the EO sensor 44 to either measure the position on the target that is imaged at the front focal plane or to adjust the position of the target so that target center is imaged at the front focal plane. Calibration to target center is generally preferred to preserve symmetry. Depending upon the configuration of the test station, collimating optics 60 may be an off-axis parabolic mirror as shown or any other combination of one or more optical elements that collimates the EM radiation at the front focal plane.

Since the detector is fixed in a single transverse plane to the optical axis, the detector captures an image of the target in which the effective PSF is broadened (blurred) to either side of the spatial position that is optically conjugate to the actual detector position. The detector may capture a sequence of images and average them to form a single lower noise image of the static target. Additionally a non-uniformity correction (NUC) may also be performed to mitigate pixel gain and offset differences in the image. A processor 62 processes the image to measure this blur and determine the actual position ($d_{actual}$) for the detector by, for example, computing the attenuation of spatial frequencies as a function of spatial position. This computation falls into a family of algorithmic approaches, we will denote the transfer function approach and is used to generate a "through focus curve" for the EO Sensor 44 based on manipulation of the captured images alone. The peak in the through focus curve corresponds to the actual detector position, which is offset from the desired detector position by some amount. Another distinct family of approaches involves iteratively simulating the test station and EO Sensor 44 response to fit a simulated image to the detected image. The detector position error is then directly computed via the actual detector position that produces a simulated image with the best match to the captured image.

In terms of the afocal optical system, the transverse magnification, m, combined with the shape of the target h in the x-y plane defines the geometric x-y dimensions of the image. The longitudinal magnification ($m_z = m^2$, z-axis) is the transverse magnification squared. The longitudinal magnification defines the relationship between points $Z_A$ and $Z'_A$. This means that an aperture centered at $F_{F1}$ (but tilted to achieve a variety of $Z_A$s) will produce an image of the same general shape, but scaled by the longitudinal and transverse magnifications for the different planes (x-y and z). Because the image is always measured in a single plane by the detector, the different $Z'_A$s from the tilted target define the blur or broadening of the geometric image for that portion of the measured image (effectively mapping a metric of the z-axis to the x-y plane). Multiple images for the same fixed test configuration may be captured and averaged together to reduce detector noise. By measuring this blur as a function of spatial position, the processor measures the actual detector position as the position that produces the minimum blur. Knowing the desired detector position (nominally the rear focal plane, $F_{R2}$ of the EO Sensor 44 for an infinity focused system) and the actual detector position, we can determine the detector position error.

Figure 5:
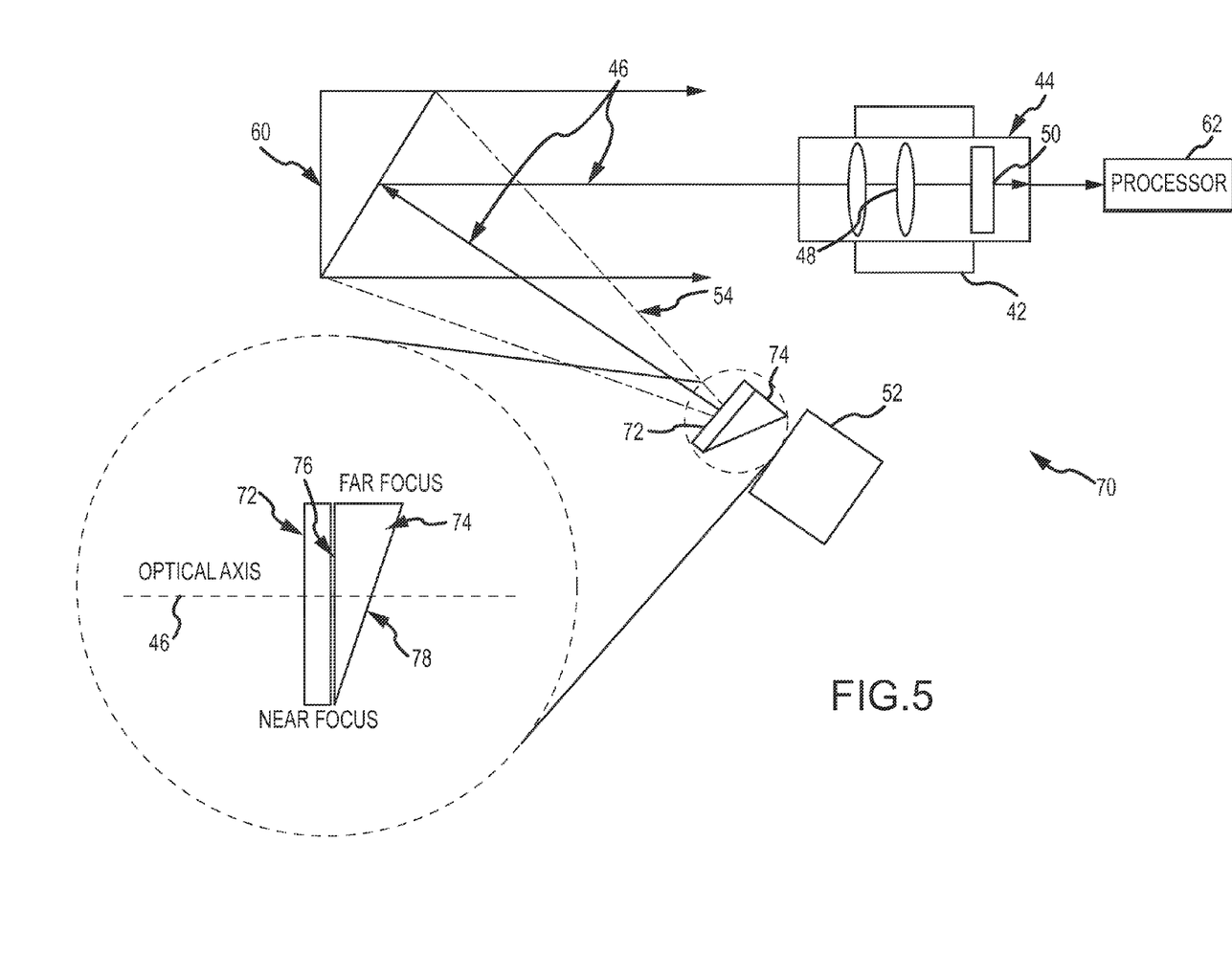
FIG. 5 is another embodiment of a motionless focus evaluation test station in accordance with the present invention for EO sensors that do not possess a dynamic focusing capability.
Figure 6A:
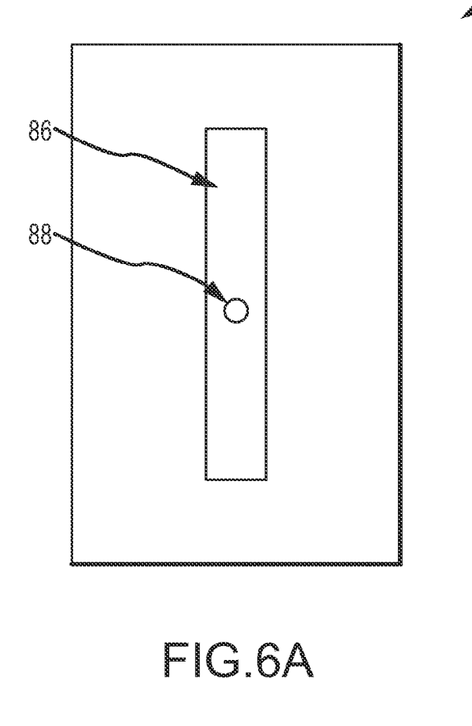
FIGS. 6a and 6b are front and side views of a single-slit target with a single angle of cant.
Figure 6B:
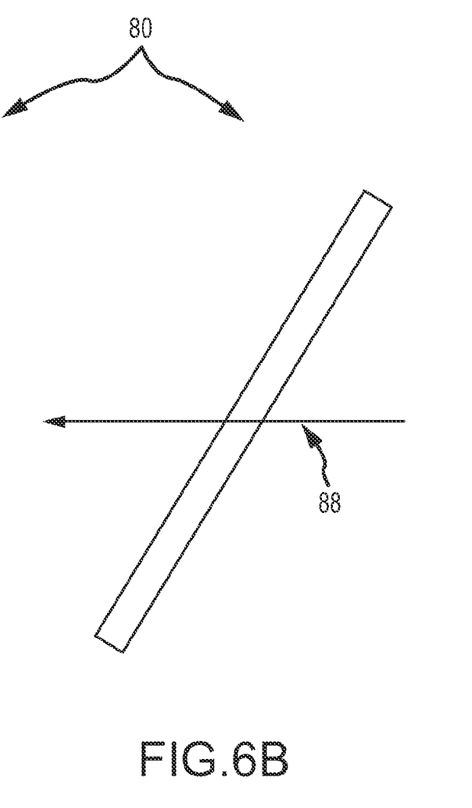

In an embodiment shown in FIG. 5, a motionless focus evaluation test station 70 comprises the source 52, collimating optics 60, fixture 42 for mounting the EO sensor 50 and processor 62 as in the previous embodiment. A positionally-fixed target 72 is positioned orthogonal to optical axis 46. The target is mounted on an optical material 74 having a refractive index greater than air. Optical material 74 has non-parallel opposing surfaces 76 and 78 such as to form a "wedge" in which the thickness of the optical material varies across the target. It should be apparent to those skilled in the art that a "wedge" is but one of the simplest of many forms the two surfaces could make that would accomplish the same goal. Target 72 is mounted on surface 76, which is itself orthogonal to optical axis 46. The optical material 74 may be positioned either behind or in front of target 72. The variable thickness of the optical material slows the EM radiation passing through to effectively cant target 72 as in the previous embodiment. The thicker the glass, the larger the effective cant. The position of target 72 may be offset so that the effective target center coincides nominally with the front focal plane of the collimating optics. Together the target 72 and optical material 74 provide a limiting aperture that exhibits an induced shift in optical focus at different positions along the aperture such that different positions on the target are imaged to different planes along the optical axis. The target and optical material may be rotated to a non-perpendicular angle Φ around the optical axis to allow for sub-pixel sampling of the effective point spread function (PSF). Processor 62 processes the image as before to measure the blur as a function of spatial position and determine the actual detector position.

FIGS. 6a-6b and 7a-7b illustrate a single slit canted target 80 (not rotated about the optical axis) and the detected images 82, 84 when the desired detector position is at the actual detector position and offset from the actual detector position, respectively. Target 80 comprises a single narrow slit 86 on and canted at a non-orthogonal angle to optical axis 88 that defines the limiting aperture that exhibits an induced shift in optical focus at different positions along the aperture such that different positions on the target are focused at different image planes. In this case, the system is calibrated to place the center of slit 86 at the focal plane of the collimating optics such that the image of the target center will correspond to the desired detector position.

The transverse magnification, combined with the shape of slit 86 in the x-y plane defines the geometric x-y dimensions of the images 82, 84. The longitudinal magnification defines the relationship between the position of points on the target and their corresponding focal planes in the EO sensor. This means that canted slit 86 will produce an image of the same general shape, but scaled by the longitudinal and transverse magnifications for the different planes (x-y and z). Because the image is always measured in a single plane, the different positions of the canted target define the blur or broadening of the geometric image for that portion of the measured image (effectively mapping a metric of the z-axis to the x-y plane).

Figure 7A:
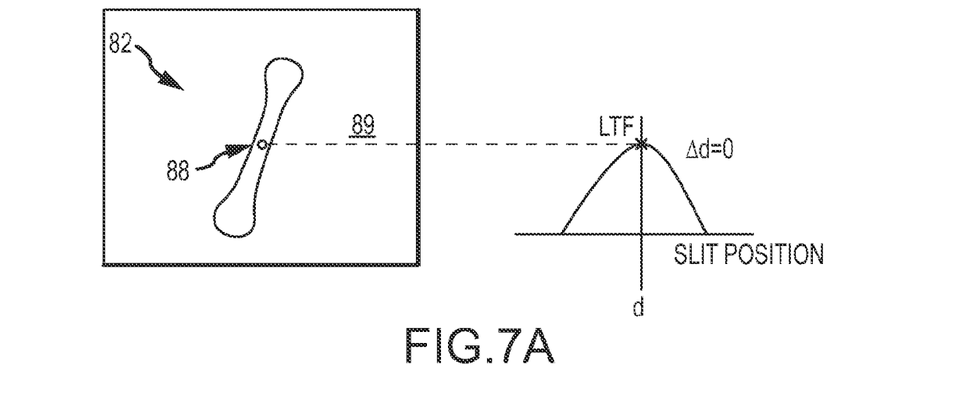
FIGS. 7a and 7b are diagrams illustrating the target image at the detector where the actual detector position is respectively at and offset from the target center.

As shown in FIG. 7a, the actual detector position 88 coincides with the center 89 of slit 86 and the desired detector position. The detector position error Δd is zero. In this case, image 82 is symmetric with the minimum blur occurring at its center coincident with the center 89 of slit 86. As one moves away from the center of slit 86 the target becomes blurred at the detector plane and image 82 broadens. As mentioned, different techniques may be used to measure the blur as a function of spatial position in the image to locate the actual detector position.

Figure 7B:
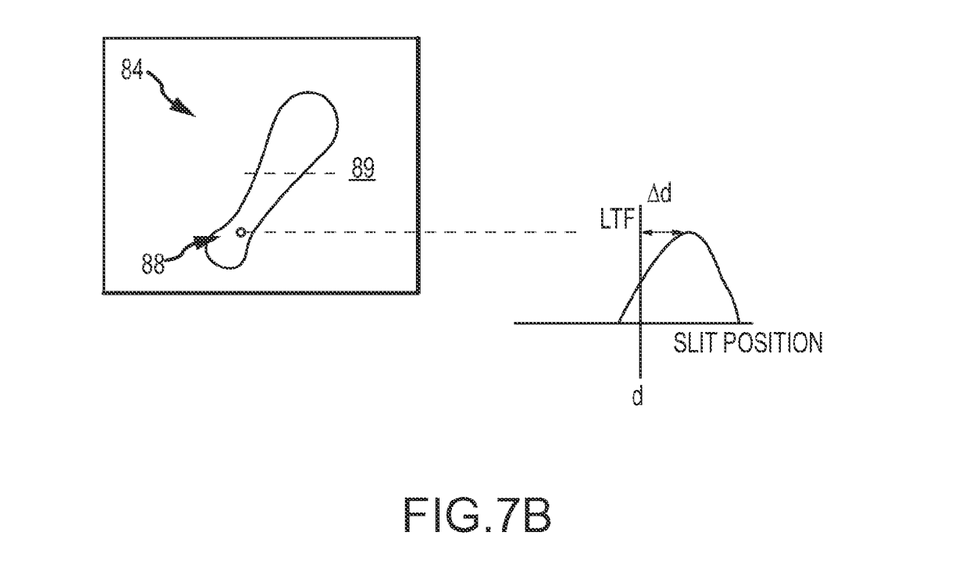

As shown in FIG. 7b, the actual detector position 88 is offset from the center 89 of slit 86 and the desired detector position. The detector position error Δd is given by this offset. In this case, image 84 is non-symmetric with the minimum blur offset from the center of the image and the center of slit 86. The portion of image 84 that is the furthest from the desired detector position experiences the most blur and thus exhibits the largest amount of broadening.

There are a myriad of options for processing the acquired image data from the canted target to measure the blur as a function of spatial position and determine the detector position error (Δd). As in any image processing technique, the best results are typically obtained if the input data is generated in a way to minimize noise contributions. While there are many ways to mitigate noise, the first step typically performed in any data collection is to acquire a statistically significant number of samples. In our case, this manifests itself as simply recording a sequence of images with the motionless test station turned on. The sequence of images can be processed to determine a mean response to the target, reducing the effects of temporal noise in the system. In addition, because the pixel gain and offset levels are a nuisance parameter (i.e. they contribute noise to the algorithm, but no signal) a Non-Uniformity Correction (NUC) should be performed. There are two primary options to consider to measure the blur, the first being a transfer function approach (typically used if the target has a relatively simple geometry), and the second being an iterative modeling approach comparing a simulated EO sensor response at a variety of detector position errors to the acquired target image (typically used if the target has complex geometry).

The transfer function approach uses the fact that the target's limiting aperture produces an image that can be represented as the convolution of the geometric image (no diffraction effects) with the point spread function of the EO sensor. In the case of a point target, the image is simply the point spread function of the EO sensor (detector sampling effects included). In the case of a slit target, the image can be represented by a convolution of the geometric image with the line-spread function (the point spread function along one axis). Because, in general the image depends on the point spread function of the EO sensor, the EO sensor's imaging performance can be evaluated directly by determining the Fourier transform of this function (typically referred to as the transfer function). The transfer function determines the attenuation of spatial frequencies for the EO Sensor's optical components. However, because the detector pixel elements limit the sampling frequency, it is impossible to reconstruct the transfer function below the Nyquist sampling criteria without imposing an additional constraint. In order to compute the transfer function above and below the detector sampling frequency, it is necessary to have measurements at a variety of pixel phasings (i.e. the image of the target's geometric edge, must cross at a variety of sub-pixel locations), requiring that the target edge be placed at a non-perpendicular angle to the detector sampling grid.

In general, the EO sensor's detector should be placed at the position that optimizes imaging performance, typically referred to as the position of best focus (these terms are meant to be used interchangeably, although anyone skilled in the art knows that optimum detector position for a given task may not necessarily be at the position of best focus). By computing the system transfer function at various regions along a target simultaneously placed both in and out of focus of the test station's collimating optic, a curve of any desired metric can be produced from the computed transfer function vs. detector position, because simple geometrical optics equations relate transverse (x,y) target positions to axial (z) detector positions. The geometrical optics relations between the target and image conjugates constitute a projection operator, allowing the mapping of a three dimensional object to a two dimensional plane (in our case the detector plane). The transfer function metric of choice vs. detector position can be plotted, and is typically referred to as the through focus curve for a system. In other words, the through focus curve maps $Z'_A$ via $Z_A$ and $m^2$ to a metric for magnitude of blur. $Z'_A$ is determined by applying the inverse of the projection operator, using the known target dimensions and the target image. The $Z'_A$ that produces the minimum blur is then determined to be the actual detector position. The shift of the actual detector position from the desired detector position is the detector position error. This is indicated in the through focus curve by the shift of the peak from the desired detector position.

Each spatial position along the canted target is optically conjugate to a particular image plane. For example if the target is a slit with center at infinity focus, the center of the target is conjugate to the rear focal plane of the EO sensor and the portions of the target to either side of the center are imaged to planes on either side of the rear focal plane of the EO sensor. As long as the tilt and length of the target produce sufficient range through focus, the plane that coincides with the actual position of the detector will be within the range of conjugate image planes. Because the detector is at a fixed plane, the image will be blurred via a defocus error to varying degrees for all points along the target except at the target position that is optically conjugate to the plane of the detector, where the blur from defocus will be at a minimum. Thus, the peak (or trough depending on the method of computation) of the through focus curve will occur at the target position optically conjugate to the actual detector plane position. If the position on the target conjugate to the desired detector position is known, then the difference between the desired detector and actual detector positions can be computed to produce the detector position error ($\Delta d$).

Figure 8:
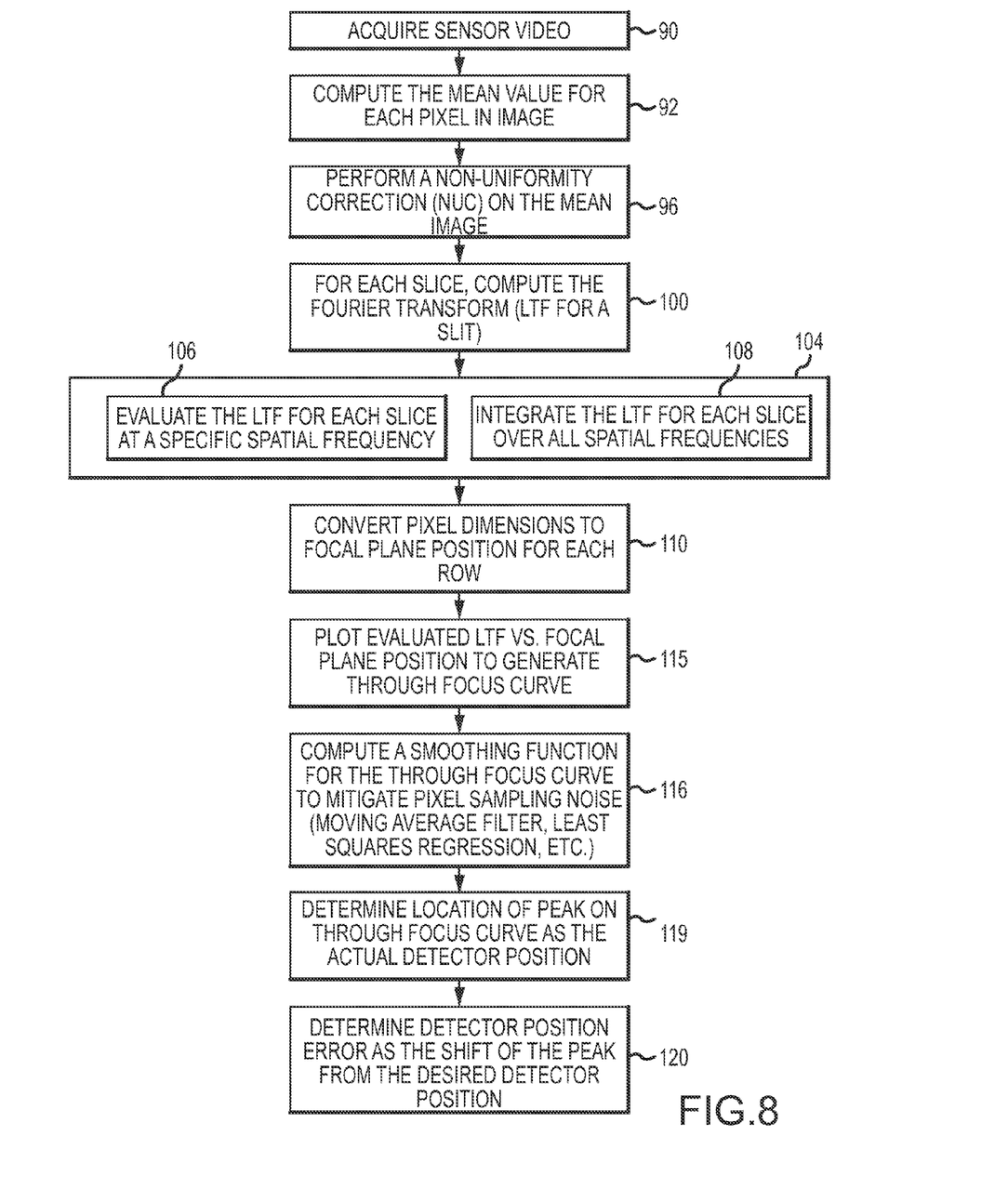
FIG. 8 is a flow diagram illustrating an embodiment of a transfer function approach for generating a through focus curve from a single target image.
Figure 9A:
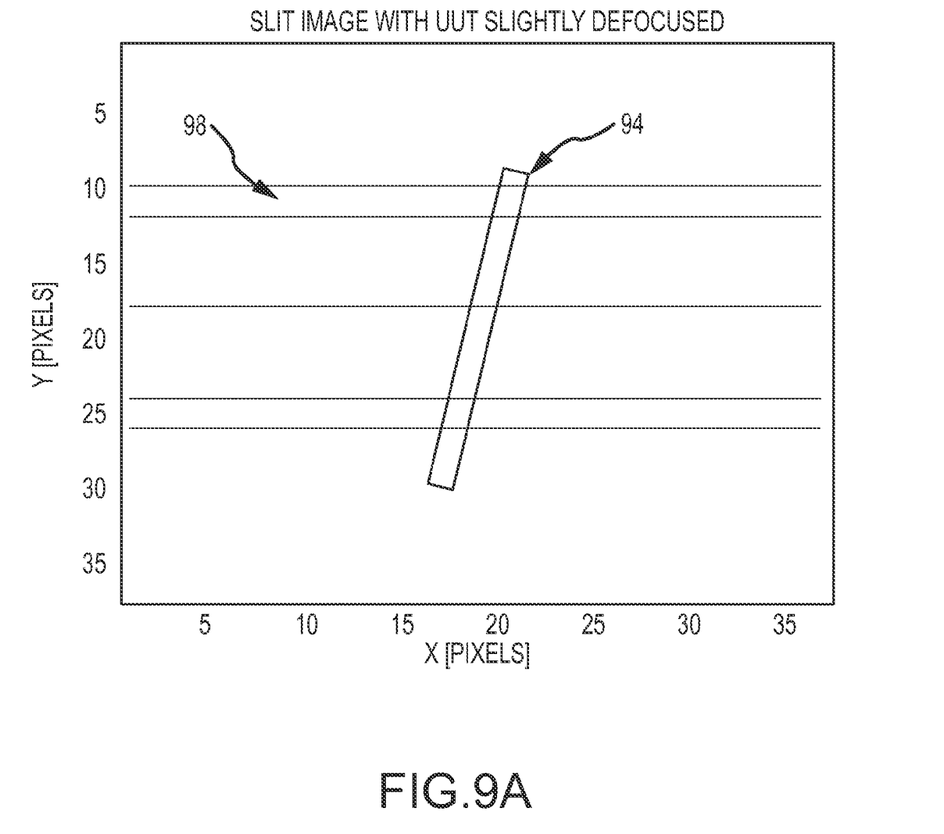
FIGS. 9a, 9b and 9c are respectively diagrams illustrating the computation of frequency transform along slices through the target image, the Line Transfer Function (LTF) of the system and the through focus curve.
Figure 9B:
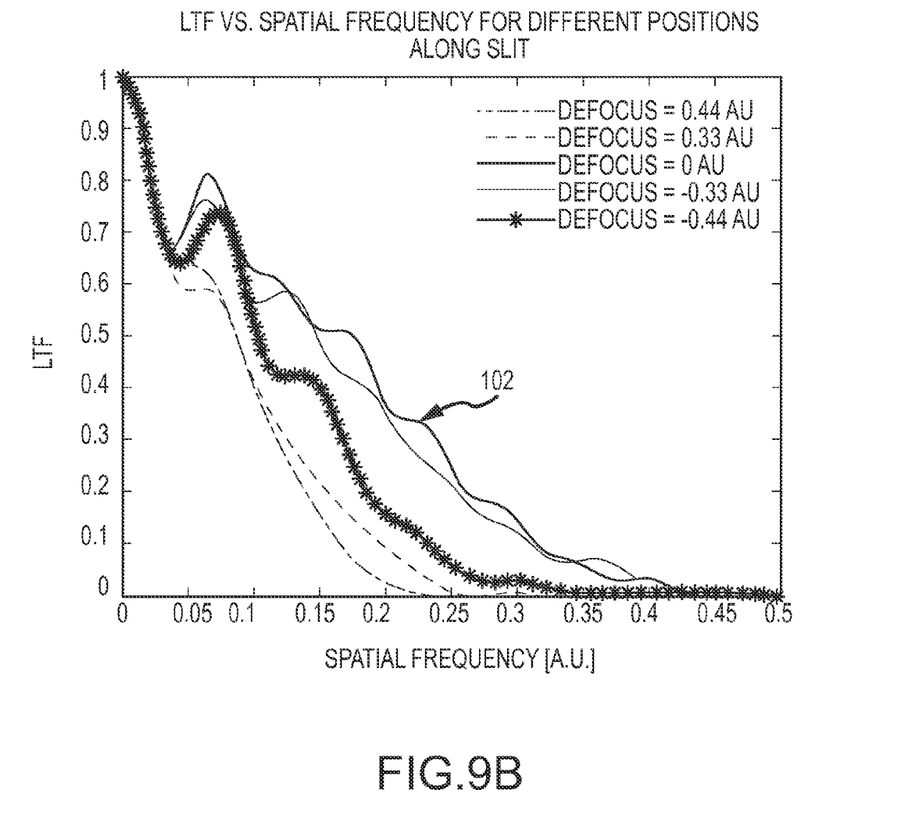

An embodiment for measuring detector position error using a single slit canted target is depicted in FIGS. 8 and 9a-9c. The EO sensor detector acquires sensor video of the single slit canted target to provide a sequence of images (step 90). The processor computes a mean value for each pixel in the image across the sequence of images to mitigate temporal noise of the detector (step 92) and performs a non-uniformity correction (NUC) to remove pixel gain and offset differences from the image 94 (step 96). For each row or "slice" 98 orthogonal to the slit direction, the processor computes a Fourier transform (e.g. Fast Fourier Transform (FFT) or Discrete Fourier Transform (DFT)) (step 100). For a slit with a narrow enough width, the Fourier transform is the Line Transfer Function 102 of the system corresponding to the target location evaluated by the slice. The LTF 102 for each of five slices 98 shown in FIG. 9a is plotted in FIG. 9b.

Figure 9C:
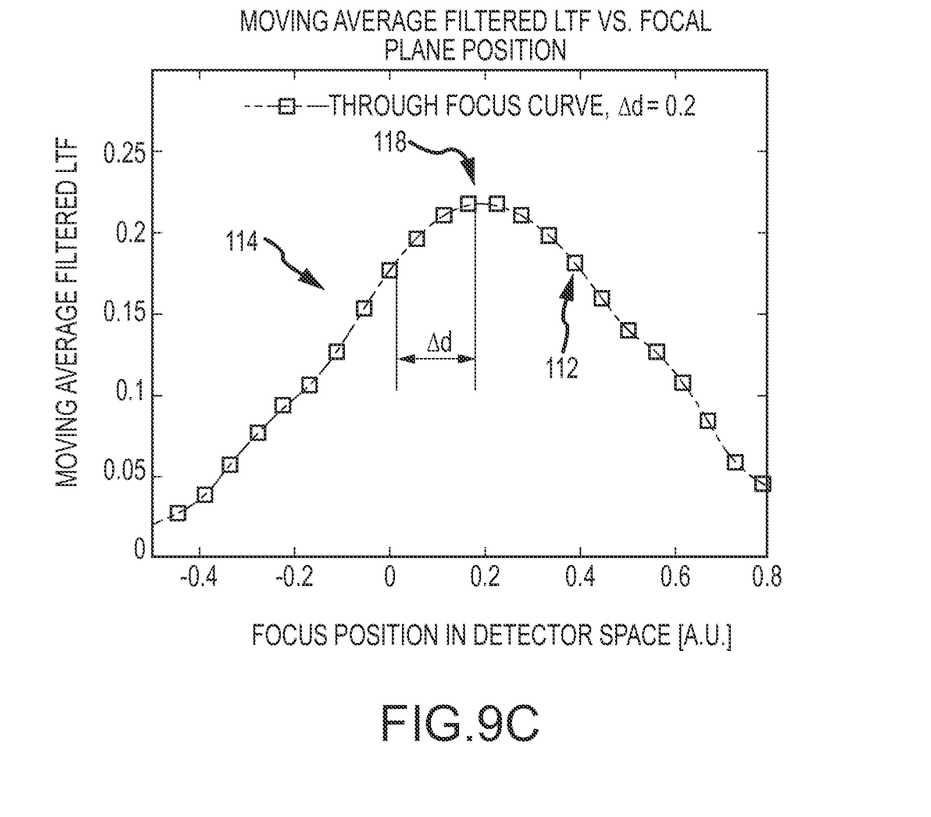

The processor evaluates the LTF for each slice to produce a value that is a measure of blur (step 104). There are many different metrics of imaging performance that may be used to evaluate the LTF. The processor may integrate the LTF for each row over all spatial frequencies (step 106). For those skilled in the art a plot of the integrated transfer function vs. detector focus position is analogous to the Strehl Ratio as a function of defocus error. Alternately, the processor may select a spatial frequency that magnifies the transfer function differences as a function of detector focus position (typically near half the cut-off frequency of the EO Sensors optical components, although the exact optimum frequency will differ based on other aberrations in the system) (step 108). With knowledge of the target geometry, the processor converts pixel dimensions in the x-y plane to detector plane positions along the optical axis for each slice (step 110). The processor plots the LTF value 112 vs. detector plane position for each of the slices to generate a through focus curve 114 as shown in FIG. 9c (step 115). The fidelity of curve 114 is set by the pixel size and thus can be quite high. If noise is present in the computation due to pixel sampling effects, the processor may apply a smoothing function to the LTF values to mitigate the impact on the detector position error computation (step 116). Here again there are many alternatives (e.g. moving average filter, least squares regression, etc.), but all come down to the same goal of removing high frequency components of the curve, suspected to be noise driven, with minimum impact to the measurement via a low pass filter. The focal plane position, coincident with the peak 118 of the through focus curve 114, is output as the actual detector position (step 119). If the desired placement of the EO sensor detector position in relation to the target (for many instances this would be the position on the target that is at infinity focus for the test system collimator) is known, the detector position error ($\Delta d$) can be computed as the difference between the actual detector position and the desired detector position (step 120) (e.g. the shift of the peak from the desired detector position).

Figure 10:
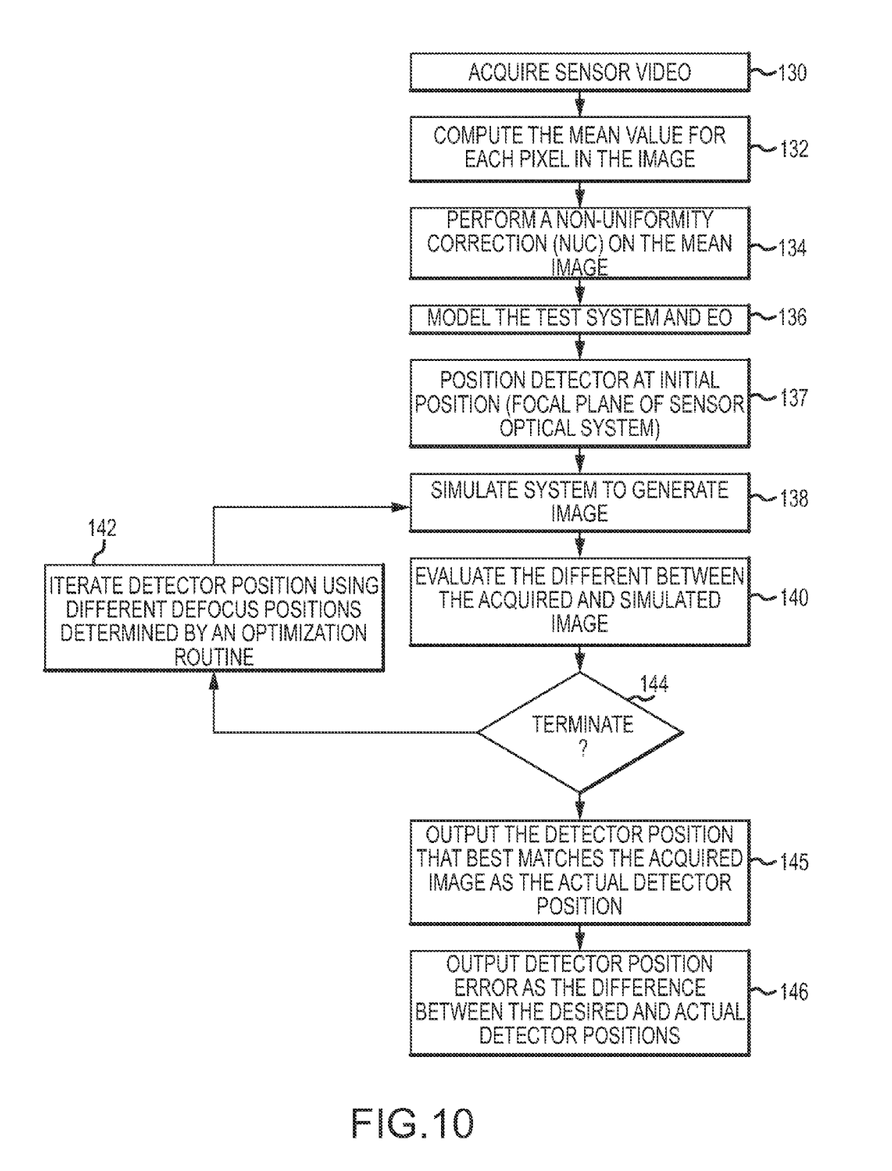
FIG. 10 is a flow diagram illustrating an alternate embodiment in which a target image is iteratively simulated to match the detected target image to measure the actual detector position and detector position error.

An embodiment for measuring detector position error by iteratively simulating the EO sensor and test system response to match the detected image is depicted in FIG. 10. The iterative modeling approach is meant to account for situations in which the target geometry is too complex to compute simple transfer functions from the acquired EO sensor images. The EO sensor detector acquires sensor video of the canted target to provide a sequence of images (step 130). The processor computes a mean value for each pixel in the image across the sequence of images to mitigate temporal noise of the detector (step 132) and performs a non-uniformity correction (NUC) to remove pixel gain and offset differences from the image (step 134).

The processor implements a model of the test system and EO sensor (with both noise and signal effects preferably accounted for) (step 136). The processor positions the detector position in the model at an initial state (nominally the desired optimal position at the front focal plane of the sensor's optical assembly) (step 137) and simulates the system to generate a simulated image of the target (step 138). The processor evaluates the difference between this simulated image and the acquired image for the real EO sensor (e.g. minimum mean-square error (mmse)) (step 140). The processor implements an optimization/estimation routine (e.g. Levenberg-Marquardt, Maximum Likelihood Estimate Methods, etc.) to iterate through different defocus positions (representing different detector position errors) (step 142) in the simulation (step 138) and evaluate each simulated image (step 140) until the difference between the simulated and acquired images is below a termination threshold for the iterative algorithm, at which point the simulated image for that particular detector position is considered the "best match" and the processor terminates the search (step 144). The processor outputs the detector position corresponding to the best match as the actual detector position (step 145). The processor computes the difference between the actual detector position and the desired detector position to output the detector position error ($\Delta d$) (step 146).

In general the role of the optimization/estimation routine is to provide an efficient method of exploring the different detector defocus positions. Because all optimization routines trade some form of speed for accuracy, the particular routine chosen for implementation should be based on an evaluation of the desired task. In addition, because this branch of algorithmic solutions is much more computationally intensive than the transfer function branch it wouldn't typically be used for targets with simple geometry, although there is no analytical reason why it couldn't be employed in this scenario either.

Figures 11A, 11B:
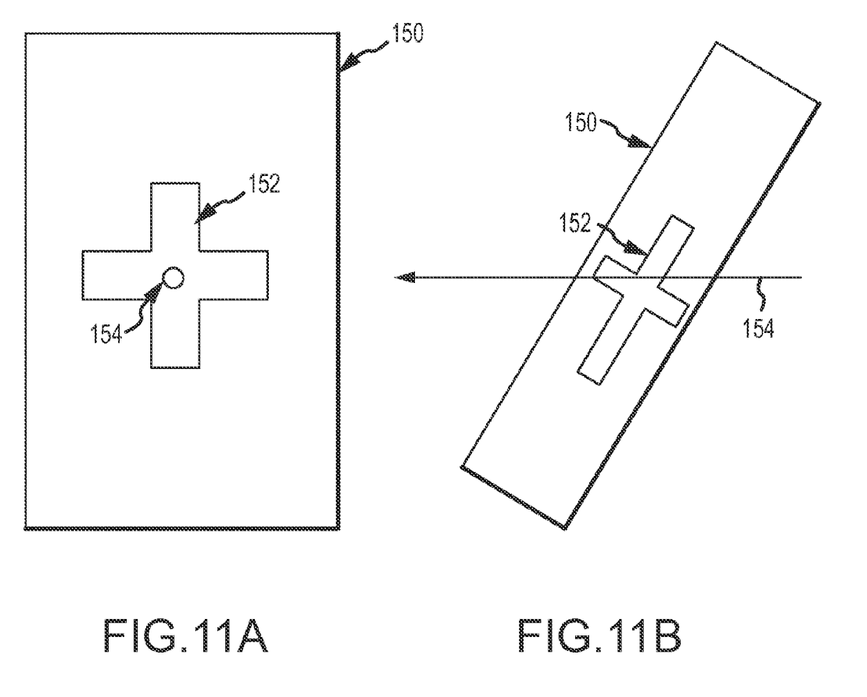
FIGS. 11a and 11b are front and side views of a cross-slit target with a compound angle of cant.

In general, the target's limiting aperture comprises defined spatial features of known dimension in both the plane of the cant and in the plane orthogonal thereto. The target may, for example be, a single slit, a pair of orthogonal slits that form a cross, a circle, a square, a 1-d array of slits, a 2-d array of slits, a 1-d array of crosses, a 2-d array of crosses, a 1-d array of circles, a 2-d array of circles, a 1-D array of squares, a 2-D array of squares or other more complex aperture geometries. FIGS. 11a-11b illustrate a target 150 comprising a pair of orthogonal slits that form a cross 152. Target 150 is canted at a non-perpendicular angle to the optical axis 154 to provide the induced shift in optical focus and is rotated at a non-perpendicular angle around the optical axis o allow for sub-pixel sampling of the effective point spread function (PSF).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A motionless focus evaluation test station for measuring detector position error in an electro-optic (EO) sensor, said EO sensor comprising an optical assembly that focuses collimated light onto a detector positioned substantially perpendicular to an optical axis of the test station at an unknown position $d_{actual}$ nominally at a known desired position $d_{desired}$ from said assembly, said EO sensor having no dynamic focusing capability to adjust detector position, said test station comprising:
   a positionally-fixed source that emits electromagnetic (EM) radiation that diverges along the optical axis of the test station, said EM radiation having a wavelength in a range between 0.2 micron and 30 microns;
   collimating optics that collimate the EM radiation and direct it along the optical axis to the EO sensor;
   a positionally-fixed target in the path of the diverging EM radiation, said target comprising a limiting aperture that exhibits an induced shift in optical focus at different positions along the aperture such that different positions on the target are imaged to different focal planes at the detector, said detector capturing an image of the target that is blurred to either side of the spatial position that is optically conjugate to the actual detector position; and
   a processor that processes the image to measure the blur as function of spatial position to measure the actual detector position $d_{actual}$ and output the detector position error $\Delta d$.

2. The test station of claim 1, wherein said target is rotated to a non-perpendicular angle about the optical axis.

3. The test station of claim 1, wherein said target is canted at a non-perpendicular angle to the optical axis to shift the optical focus at different points along the aperture.

4. The test station of claim 1, wherein said target is mounted at a perpendicular angle to the optical axis, said target further comprising an optical material, with refractive index greater than air, having non-parallel opposing surfaces to shift the optical focus at different points along the aperture.

5. The test station of claim 1, wherein said EO sensor and said collimating optics constitute an afocal optical system, said detector distance $d_{actual}$ is nominally at the back focal plane of the optical assembly and the center of the target is nominally at the front focal plane of the collimating optics.

6. The test station of claim 1, wherein said target's limiting aperture comprises one of a single slit, a pair of orthogonal slits that form a cross, a circle, a square, a 1-d array of slits, a 2-d array of slits, a 1-d array of crosses, a 2-d array of crosses, a 1-d array of circles, a 2-d array of circles, a 1-D array of squares, and a 2-D array of squares.

7. The test station of claim 1, wherein said station measures the detector position error for a given EO sensor in less than 5 minutes.

8. The test station of claim 1, wherein said detector exhibits a pixel sampling frequency and said target is projected onto the detector via a projection operator on the image of said limiting aperture, said processor computing an attenuation of spatial frequencies below and above the detector's pixel sampling frequency as a function of spatial position in the image to produce a focus metric, said projection operator mapping said spatial positions to different distances d via an inverse of the projection operator to produce a curve that plots said focus metric against distance d, said processor measuring the actual detector position $d_{actual}$ at a peak in the curve and the detector position error $\Delta d$ as the shift of the actual detector position from the desired detector position.

9. The test station of claim 8, wherein said processor integrates the attenuation of spatial frequencies across all spatial frequencies for each spatial position to produce the focus metric.

10. The test station of claim 8, wherein the processor selects the attenuation of a single spatial frequency for each spatial position to produce the focus metric.

11. The test station of claim 8, wherein said target's limiting aperture consists of a symmetric geometric extent, wherein said processor computes the attenuation of spatial frequencies in a single direction via a discrete Fourier transform (DFT) or fast Fourier transform (FFT) for each spatial position to produce the focus metric.

12. The test station of claim 1, wherein said detector exhibits a pixel sampling frequency and said target is projected onto the detector via a projection operator on the image of said limiting aperture, said processor convolving the detected image with an ideal target image to compute the amount of blur in the point spread function with sub-pixel resolution as a function of spatial position in the image to produce a focus metric, said projection operator mapping said spatial positions to different distances d via an inverse of the projection operator to produce a curve that plots said focus metric against distance d, said processor measuring the actual detector position $d_{actual}$ at a peak in the curve and the detector position error $\Delta d$ as the shift of the actual detector position from the desired detector position.

13. The test station of claim 1, wherein said target's limiting aperture consists of an asymmetric geometric extent, said processor implements a model of the test station and the EO sensor, simulates the model for the detector placed at different positions to generate simulated target images and selects the distance d that produces the simulated target image that is the best fit to the detected target image as the actual detector position $d_{actual}$.

14. The test station of claim 13, wherein the processor initially places the detector in the model at the front focal plane of the optical assembly.

15. A motionless focus evaluation test station for measuring detector position error in an electro-optic (EO) sensor, said EO sensor comprising an optical assembly that focuses collimated light onto a detector positioned substantially perpendicular to an optical axis of the test station at an unknown position $_{actual}$ nominally at a known desired position $d_{desired}$ from said assembly, said EO sensor having no dynamic focusing capability to adjust detector position, said test station comprising:
- a positionally-fixed source that emits electromagnetic (EM) radiation that diverges along the optical axis of the test station, said EM radiation having a wavelength in a range between 0.2 micron and 30 microns;
- collimating optics that collimate the EM radiation and direct it along the optical axis to the EO sensor, said collimating optics and said EO sensor constituting an afocal optical system;
- a positionally-fixed target in the path of the diverging EM radiation with the center of the target positioned at the front focal plane of the collimating optics, said target comprising a limiting aperture that exhibits an induced shift in optical focus at different positions along the aperture such that different positions on the target are imaged to different focal planes at the detector, said detector capturing an image of the target that is blurred to either side of the spatial position that is optically conjugate to the actual detector position; and
- a processor that processes the image to measure the blur as function of spatial position to measure the actual detector position $d_{actual}$ and output the detector position error $\Delta d$.

16. The test station of claim 15, wherein said target is physically or optically canted at a non-perpendicular angle to the optical axis to shift the optical focus at different points along the aperture.

17. The test station of claim 16, wherein said target is rotated to a non-perpendicular angle about the optical axis.

* * * * *